(No Model.)
R. L. KIRBY.
WHIFFLETREE CLIP AND HOOK.
No. 461,615. Patented Oct. 20, 1891.
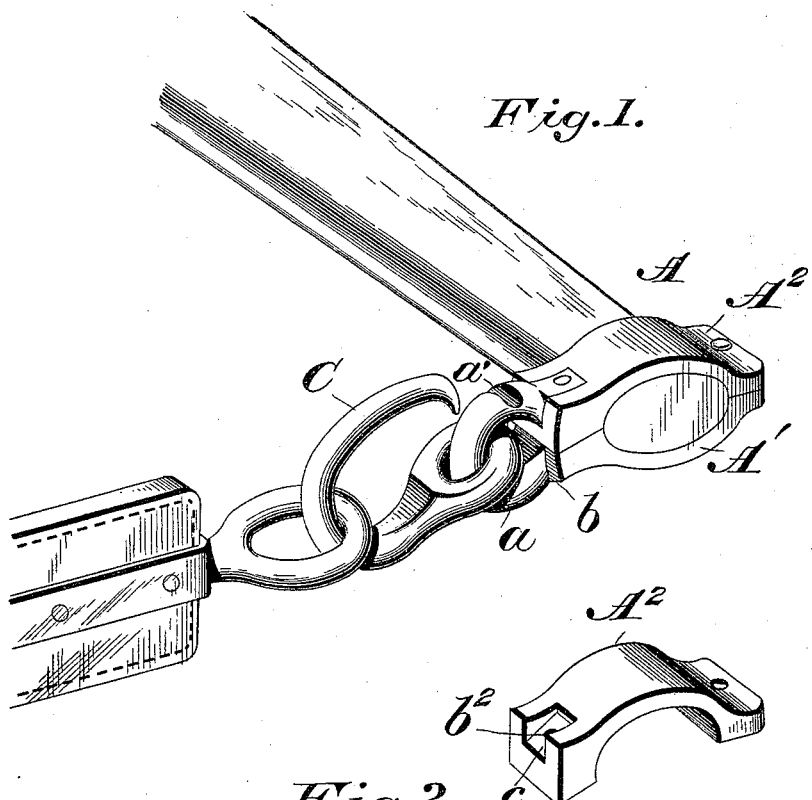
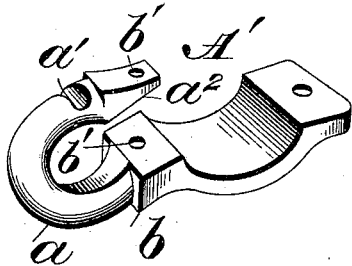
Witnesses
L. S. Elliott.
H. S. Beall.
R. L. Kirby.
Inventor
by
Attorney

UNITED STATES PATENT OFFICE.

REMEMBRANCE LINDSAY KIRBY, OF POMEROY, WASHINGTON.

WHIFFLETREE CLIP AND HOOK.

SPECIFICATION forming part of Letters Patent No. 461,615, dated October 20, 1891.

Application filed June 25, 1891. Serial No. 397,522. (No model.)

*To all whom it may concern:*

Be it known that I, REMEMBRANCE LINDSAY KIRBY, a citizen of the United States of America, residing at Pomeroy, in the county of Garfield and State of Washington, have invented certain new and useful Improvements in Whiffletree Clips and Hooks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in clips and hooks for single or double trees.

The object of the invention is to provide a cheap, simple, and effective clip which is adapted to embrace the whiffletree or singletree and be rigidly connected thereto, one part of the clip having a hook formed thereon, which, when passed over the other part, forms an eye for the reception of the draft-hook; and the invention consists in the construction and combination of the parts, as will be hereinafter fully set forth, and particularly pointed out in the claims.

In the accompanying drawings, forming part of this specification, Figure 1 is a perspective view of my invention. Fig. 2 is a perspective view showing the parts detached.

The clip A is made up of two parts A' and A², which are recessed, as shown, to embrace the whiffle or single tree. The part A' has a hook $a$ formed integral therewith, said hook having a recess $a'$ and a beveled end $a^2$, shoulders $b$ being formed at the intersection of the hook portion, as shown. The end of the hook and portion of the part A' beneath the same are provided with perforations $b'$, and the end of the part A² has a perforation $b^2$, which registers with the perforations $b'$. The upper part of the clip is shaped, as shown, and is provided at its front end with a recess $c$, the base of which is inclined, as shown, and in this recess fits the end of the hook, the parts being securely connected to each other by a pin or bolt, which passes through the perforations $b'$ and $b^2$. The rear end of the clip is provided with a perforation which passes through the parts A' and A² to receive a bolt for clamping the parts together.

The hook C has an eye formed at one end, and the terminal portion of said hook is bent downwardly toward the center of the eye, as shown, and this hook is adapted to receive a ring, which may be placed upon the hook by placing said ring within the recess $a'$, formed in the eye of the clip.

It will be noted that the parts A' and A² interlock with each other at their forward ends, and that the beveled end of the hook is at a different angle from the inclined portion beneath the hook, and when the bolts are passed through the perforations the parts will not only be firmly connected with each other, but the end of the hook will be re-enforced by said bolt.

Having thus described my invention, what I claim as new, and desire to secure by Letters Patent, is—

1. A clip for singletrees, consisting of the parts A' and A², the part A' being formed of a single piece and having a hook $a$ formed integral therewith, said hook having a beveled end $a^2$ and an inclined portion below the same at a different angle, and perforations $b'$ and $b'$, in combination with the part A², having a recess $c$, the base of which is inclined, said part having perforations which register with the perforations in the other part, and means for connecting the parts to each other, substantially as set forth.

2. In combination with a two-part clip having registering perforations, a hook $a$, formed integral with one of the parts and provided with a recess $a'$, the part A² having a recess $c$, within which the terminal portion of the hook $a$ lies, and a hook C, having an eye and a bent end which extends toward the center of said eye, substantially as set forth.

In testimony whereof I affix my signature in presence of two witnesses.

REMEMBRANCE LINDSAY KIRBY.

Witnesses:
ALEX GILMOUR,
E. W. GIBSON.